US007464476B2

(12) United States Patent
Le

(10) Patent No.: US 7,464,476 B2
(45) Date of Patent: Dec. 16, 2008

(54) PROFESSIONAL COMPASS RULERS

(76) Inventor: Chi-Minh Le, P.O. Box 842, Westwego, LA (US) 70096

( * ) Notice: Subject to any disclaimer, the term of this patent is extended or adjusted under 35 U.S.C. 154(b) by 0 days.

(21) Appl. No.: 11/970,383

(22) Filed: Jan. 7, 2008

(65) Prior Publication Data
US 2008/0098607 A1 May 1, 2008

Related U.S. Application Data

(63) Continuation of application No. 11/332,598, filed on Jan. 9, 2006, now abandoned.

(51) Int. Cl.
B43L 9/04 (2006.01)
(52) U.S. Cl. ........................... 33/27.032; 33/471
(58) Field of Classification Search .............. 33/27.032, 33/27.031, 27.03, 27.02, 32.1, 403, 465, 33/471, 452, 468, 469, 479, 484, 485, 486
See application file for complete search history.

(56) References Cited

U.S. PATENT DOCUMENTS

| 817,991 | A | * | 4/1906 | Ross | 33/43 |
| 964,785 | A | * | 7/1910 | Johnson | 33/43 |
| 972,936 | A | * | 10/1910 | Smith | 33/26 |
| 1,011,271 | A | * | 12/1911 | Tedesco | 33/468 |
| 1,576,800 | A | * | 3/1926 | Tibony | 33/495 |
| 3,491,448 | A | * | 1/1970 | Quinton et al. | 33/27.01 |
| 3,991,474 | A | * | 11/1976 | Rath | 33/462 |
| 5,983,509 | A | * | 11/1999 | Gosselin et al. | 33/1 SD |
| 6,405,443 | B1 | * | 6/2002 | Thorn et al. | 33/27.03 |
| 6,606,796 | B2 | * | 8/2003 | Stoneberg | 33/27.03 |

FOREIGN PATENT DOCUMENTS

JP 01171995 A * 7/1989

* cited by examiner

Primary Examiner—Christopher W Fulton
(74) Attorney, Agent, or Firm—Garvey, Smith, Nehrbass & North, L.L.C.; Brett A. North

(57) ABSTRACT

A ruler for drawing or measurement of circles, straight lines, and angles. The ruler body has a longitudinal slot in the middle and parallel with the length of the ruler. A sliding pen or pencil holder is placed within the slot for drawing or measuring. A compass is included in the combinations.

14 Claims, 4 Drawing Sheets

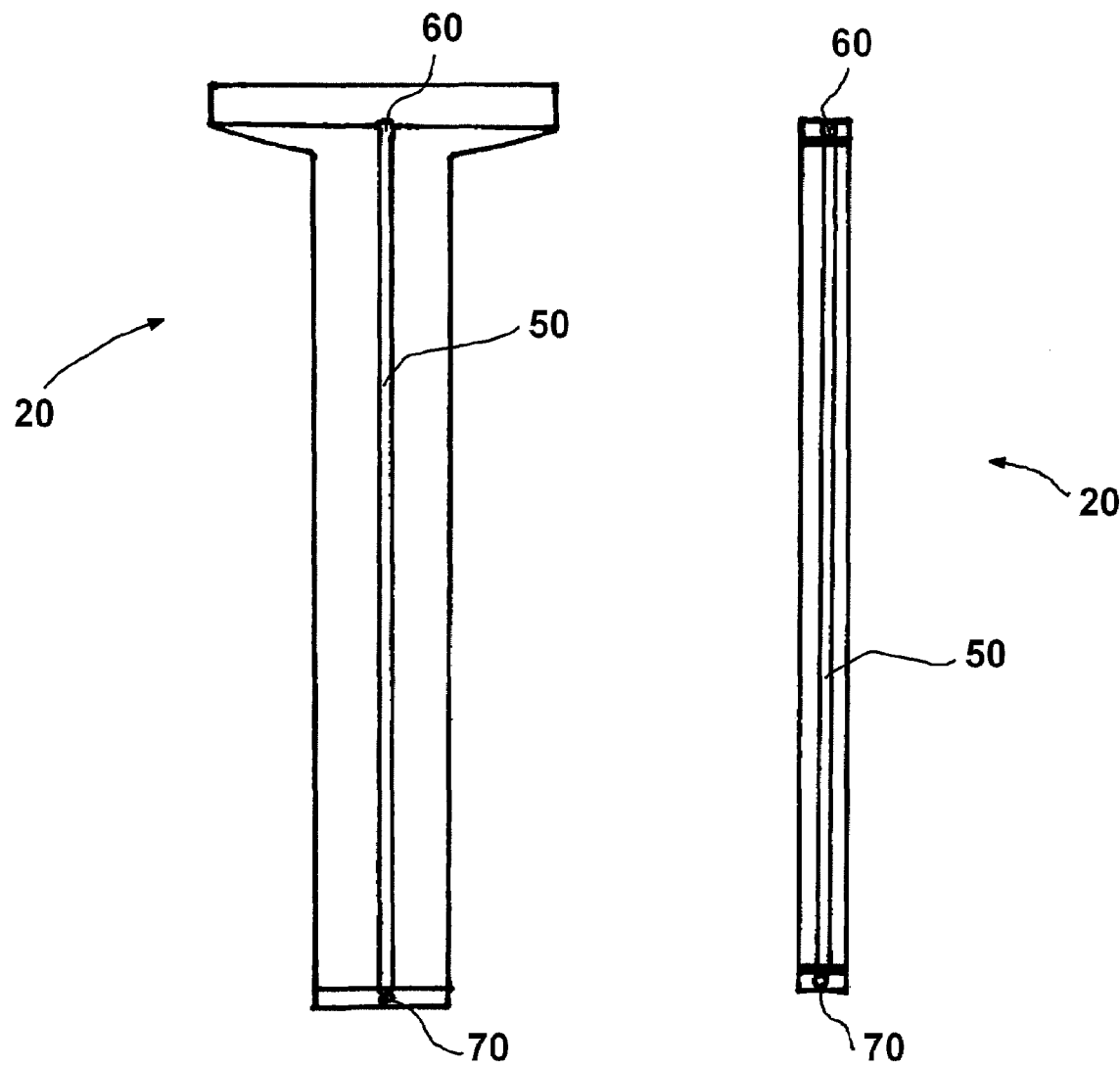
FIG. 2  FIG. 3
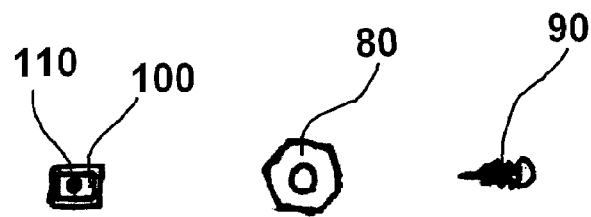
FIG. 4  FIG. 5  FIG. 6

PROFESSIONAL COMPASS RULERS

CROSS-REFERENCE TO RELATED APPLICATIONS

This is a continuation of U.S. patent application Ser. No. 11/332,598, filed Jan. 9, 2006, (now abandoned), priority of which is claimed and which is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention generally relates to rulers and compasses.

SUMMARY

In one embodiment is disclosed a ruler for drawing or measurement of circles, straight lines, and angles. The ruler body has a longitudinal slot in the middle and parallel with the length of the ruler. A sliding pen or pencil holder is placed within the slot for drawing or measuring. A compass is included in the combinations.

In one embodiment is disclosed a compass ruler wherein it is easy to compare SAE or English units with Metric units for measuring, sketching, or using the ruler as a compass for drawing a circle.

In one embodiment all lines to be sketched, radii of circles, or other objects may be measured in both SAE and Metric units at the middle of the ruler.

In embodiment is compared the different units of SAE and Metric before drawing.

In one embodiment is disclosed the combination of a straight ruler, protractor, and compass, which can be used as a simple ruler for sketching or drawing a line using a track in the middle of the ruler and parallel to the ruler's length.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is a top view of the body of the ruler shown in FIG. 1.

FIG. 3 is a side view of the body shown in FIG. 2.

FIG. 4 is a top view of a holder.

FIG. 5 is a top view of a nut.

FIG. 6 is a top view of a screw.

DETAILED DESCRIPTION OF THE INVENTION

The professional compass-ruler 10 combines the advantages of a compass, protractor, and ruler. It can be used for finding, drawing, or measuring an angle, circle, or straight line at the center of the ruler's length.

Figure 1:
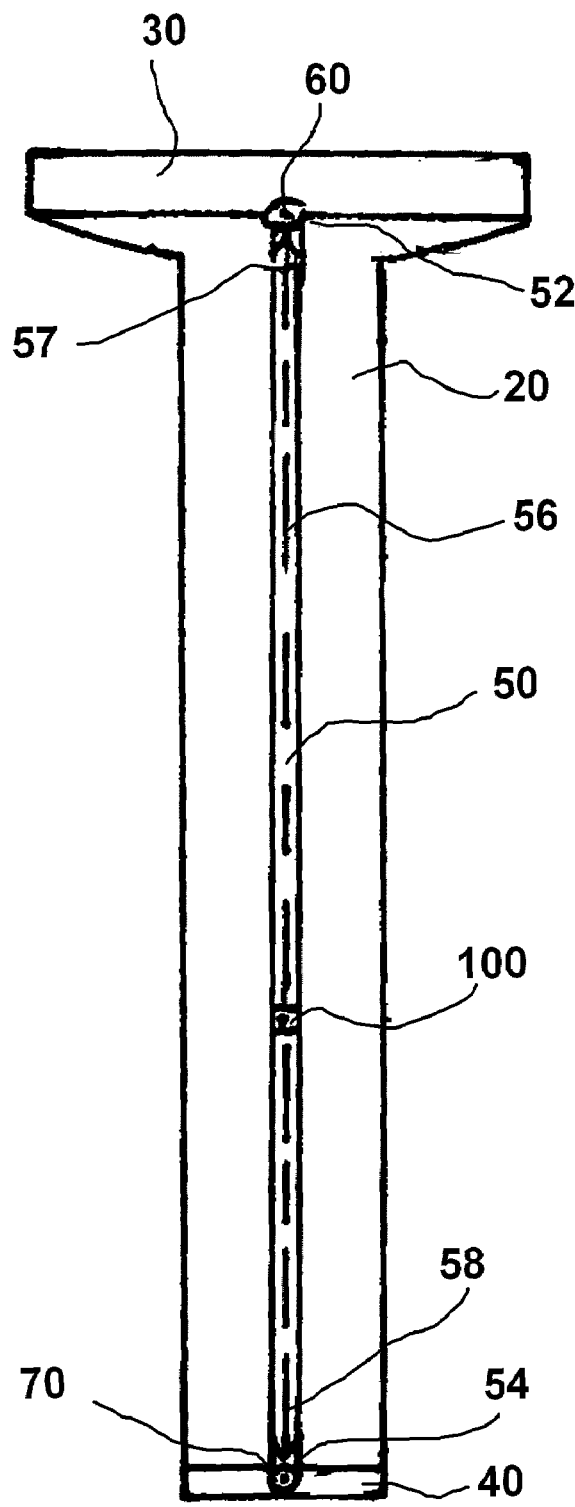
FIG. 1 is an overall top view of one embodiment.
Figure 7A:
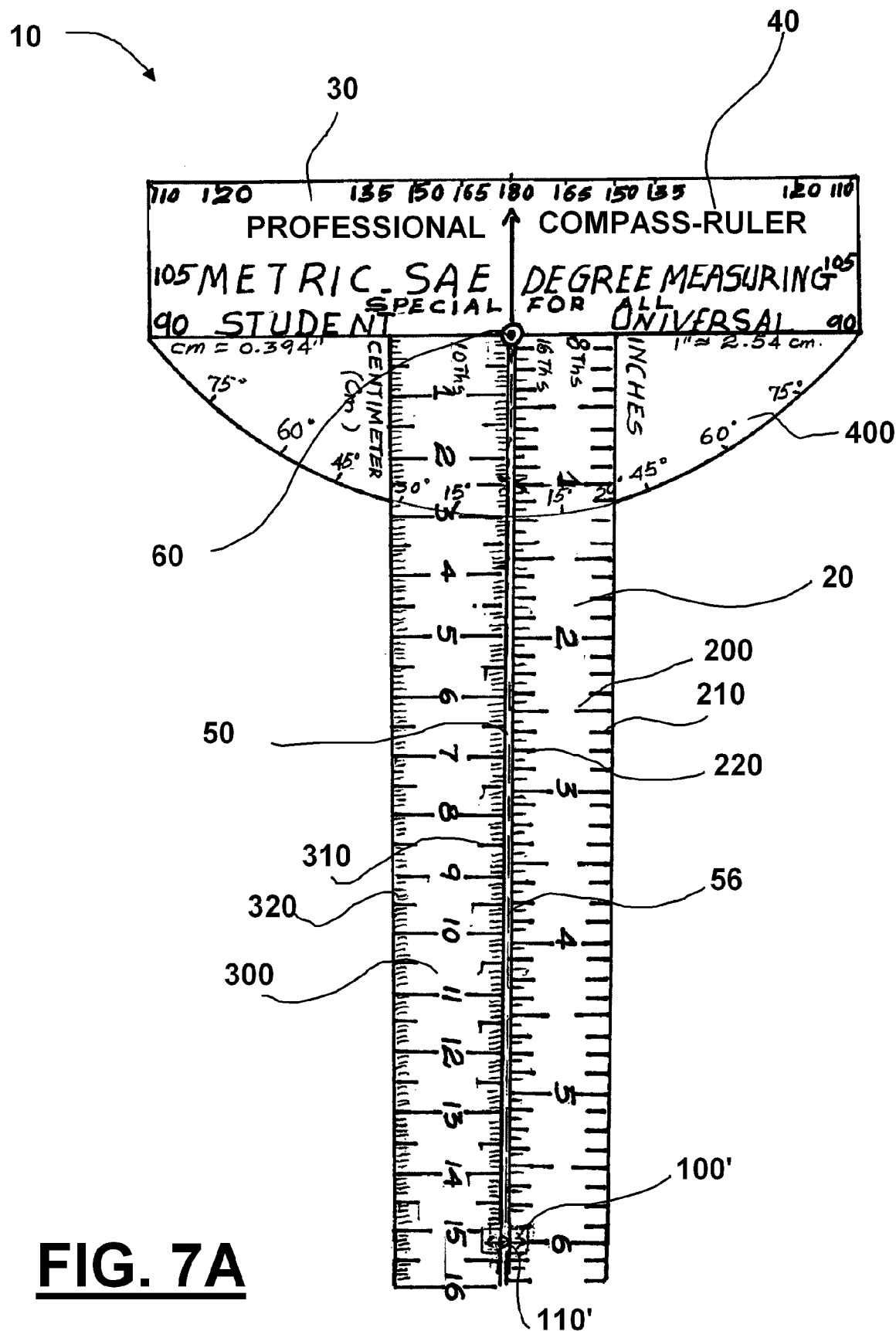
FIG. 7A is a top view of the upper section ruler of FIG. 1 showing various measuring scales.
Figure 7B:
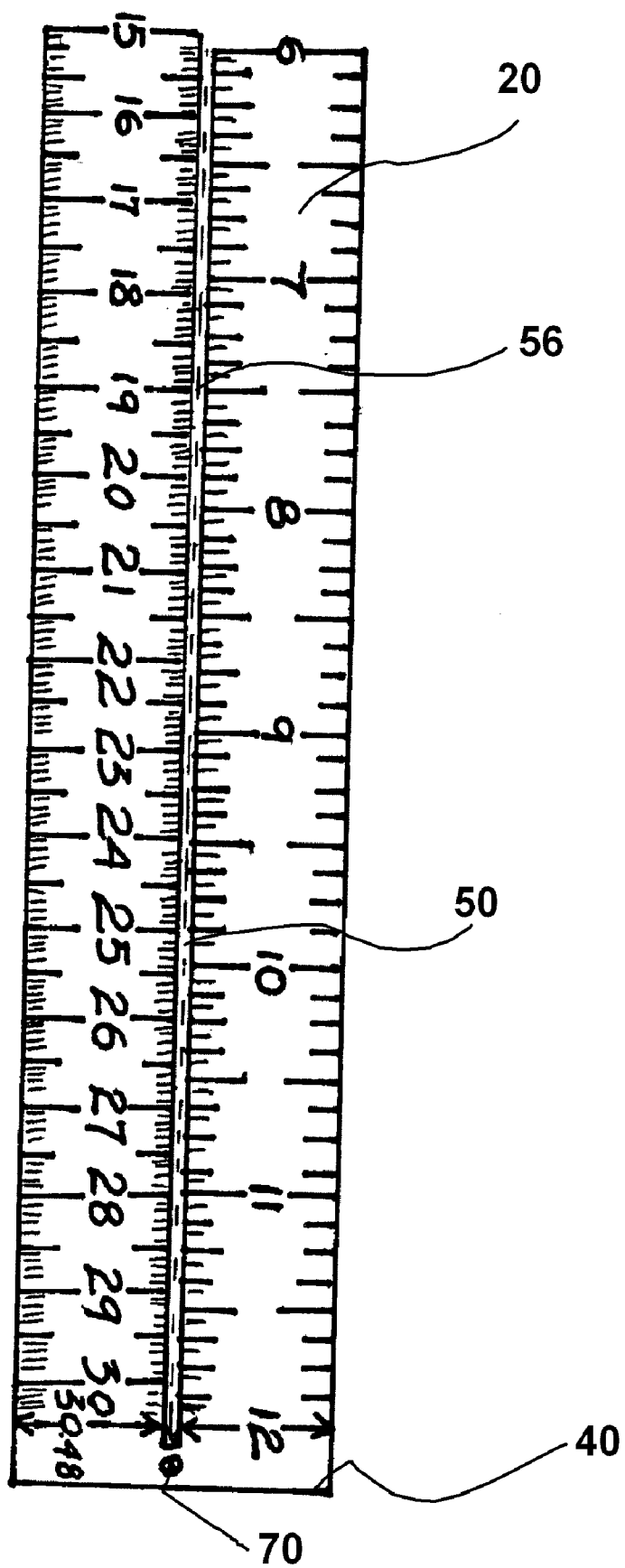
FIG. 7B is a top view of the lower section ruler of FIG. 1 showing various measuring scales.

FIG. 1 is an overall top view of one embodiment of compass-ruler 10. FIG. 2 is a top view of the body 20. FIG. 3 is a side view of the body 20. FIG. 4 is a top view of a holder 100. FIG. 5 is a top view of a nut 80. FIG. 6 is a top view of a screw 90. FIG. 7A is a top view of the upper section compass-ruler 10 showing various measuring scales. FIG. 7B is a top view of the lower section ruler of compass-ruler 10 showing various measuring scales.

In one embodiment compass-ruler 10 comprises body 20 with upper 30 and lower 40 sections, track or slot 50, and pen or pencil holder 100 slidably connected to track or slot 50. Track or slot 50 can have centerline 56, along with first 200 and second 300 liner measuring scales. First measuring scale 200 can have inner 210 and outer 220 indicia. Second measuring scale 300 can have inner 310 and outer 320 indicia. Upper section 30 can be fixed to lower section 40. Upper section 300 can include angular measuring scale 400 and larger angular measuring scale 410.

When drawing lines a pen 5 (not shown) travels along and through the ruler's 10 track 50 to leave a mark (e.g., on drawing paper). The ruler's 10 track 50 is straight from O dimension 60 to the end 70 of the ruler's 10 length.

For finding or drawing an angle—start from the central line 56 of the ruler's 10 track 50 at 180 or O (at upper opening 60) and then read the number of an angle on scale 400. If the angle is larger than 180 on the left of a central line, the degree appears on the retractor scale 410, and is the same of the degree at the opposite straight to another side below of an axis; add these numbers for the degree of an angle.

The professional compass-ruler 10 may also be used as a compass for drawing circles which have a radius within the length the ruler's 10 track 50 (between ¹⁄₁₆th of an inch to 12 inches as shown in FIG. 7A and 7B). For drawing a circle; the compass-ruler 10 can be held down by spindle screw 90 with nut 80 at upper opening 60—this point is center of the circle to be drawing. The pen or pencil holder 100 can be slid down track 50 to the selected radius of the circle to be drawn, and ruler 10 swung or rotated to make a circle.

The material for reproduction of the professional compass-ruler can include cleared mica, thin wood or stainless steel; and the ruler's 10 track 50 can be magnetic to easily slide or clutch holder 100 on tight when drawing.

The following is a list of reference numerals.

| LIST OF REFERENCE NUMERALS | |
|---|---|
| Part Number | Description |
| 5 | pen or pencil |
| 10 | compass ruler |
| 20 | body |
| 30 | upper section of body |
| 40 | lower section of body |
| 50 | track or slot |
| 52 | upper end of track or slot |
| 54 | lower end of track or slot |
| 56 | center line of track or slot |
| 60 | upper opening for nut and screw |
| 70 | lower opening for nut and screw |
| 80 | nut |
| 90 | screw |

-continued

LIST OF REFERENCE NUMERALS

| Part Number | Description |
| --- | --- |
| 100 | pen or pencil holder |
| 110 | opening in holder |
| 200 | first linear measuring scale |
| 210 | inner indicia |
| 220 | outer indicia |
| 300 | second linear measuring scale |
| 310 | inner indicia |
| 320 | outer indicia |
| 400 | angular measuring scale |
| 410 | larger angular measuring scale |

All measurements disclosed herein are at standard temperature and pressure, at sea level on Earth, unless indicated otherwise. All materials used or intended to be used in a human being are biocompatible, unless indicated otherwise.

The foregoing embodiments are presented byway of example only; the scope of the present invention is to be limited only by the following claims.

The invention claimed is:

1. A combination compass and ruler comprising:
   (a) a body having a longitudinal length along with first and second distal ends,
   (b) the body including a longitudinal slot formed therein;
   (c) the body including a pivoting point located at the first end for positioning the center of a circle to be drawn and the longitudinal slot intersects the pivoting point;
   (d) the body including a plurality of linear measurement scales along its longitudinal length which measures the distance from the pivoting point;
   (e) an angular measurement scale being at least partially located between the pivoting point and the second end, the angular measurement scale providing an angular measurement relative to the longitudinal slot; and
   (f) a pen or pencil holder which is slidably in and detachably connected to the longitudinal slot, the holder including an opening for the end point of the pen or pencil, the holder being capable of contacting the pivoting point.

2. The compass and ruler of claim 1, wherein the angular measurement scale is fixed relative to the longitudinal slot.

3. The compass and ruler of claim 1, wherein the holder includes a pair of opposed arrows indicating the center of the holder.

4. The compass and ruler of claim 1, wherein the one of the plurality of measuring scales is in SI units and a second of the measuring scales is in SAE units and each measuring scale includes two sets of longitudinally spaced apart indicia, one of each set being located adjacent the slot and the other of each set being spaced apart from the slot.

5. The compass and ruler of claim 1, wherein magnetism is used to slidably connect the holder to the longitudinal slot.

6. The compass and ruler of claim 5, wherein the longitudinal slot is located in a magnetic plate, and the holder is comprised of a material which is magnetic.

7. The compass and ruler of claim 1, the body further including a second pivoting point located at the second end and outside of the longitudinal slot, the second pivoting point also being the center of a second circle to be drawn, the linear measurement scales also measuring the distance from the second pivoting point.

8. The compass and ruler of claim 1, wherein the pivoting point includes a nut and screw for pivoting around a selected point.

9. The compass and ruler of claim 1, wherein the angular scale is transparent.

10. The compass and ruler of claim 9, wherein the transverse portion is comprised of cleared mica.

11. The compass and ruler of claim 1, wherein the body includes a transverse portion which is perpendicular to the longitudinal slot, and the angular measurement scale is transparent.

12. The compass and ruler of claim 1, wherein the longitudinal slot is a central longitudinal slot forming a track.

13. The compass and ruler of claim 1, wherein a circle as small as one fourth inch in radius can be drawn.

14. A combination compass and ruler comprising:
   (a) a body having a longitudinal length along with first and second distal ends,
   (b) the body including a longitudinal slot formed therein with a centerline;
   (c) the body including a pivoting point located at the first end for positioning the center of a circle to be drawn and the longitudinal slot intersects the pivoting point;
   (d) the body including a plurality of linear measurement scales along its longitudinal length which measures the distance from the pivoting point;
   (e) the angular measurement scale being at least partially located between the pivoting point and the second end, the angular measurement scale providing an angular measurement relative to the longitudinal slot; and
   (f) a pen or pencil placed in the longitudinal slot, the pen or pencil contacting the edges of the slot.

* * * * *